(12) United States Patent
Yang et al.

(10) Patent No.: US 11,797,492 B2
(45) Date of Patent: Oct. 24, 2023

(54) COGNITIVE METHOD TO PERCEIVE STORAGES FOR HYBRID CLOUD MANAGEMENT

(71) Applicant: International Business Machines Corporation, Armonk, NY (US)

(72) Inventors: Jun Yang, Beijing (CN); Hui Lin, Beijing (CN); Peng Fei Tian, Beijing (CN); Yue Wang, Beijing (CN)

(73) Assignee: International Business Machines Corportion, Armonk, NY (US)

( * ) Notice: Subject to any disclaimer, the term of this patent is extended or adjusted under 35 U.S.C. 154(b) by 733 days.

(21) Appl. No.: 16/865,395

(22) Filed: May 3, 2020

(65) Prior Publication Data
US 2021/0342310 A1 Nov. 4, 2021

(51) Int. Cl.
*G06F 16/182* (2019.01)
*G06F 16/17* (2019.01)
(Continued)

(52) U.S. Cl.
CPC ........ *G06F 16/1827* (2019.01); *G06F 7/5443* (2013.01); *G06F 11/3034* (2013.01); *G06F 16/1734* (2019.01); *G06N 3/08* (2013.01)

(58) Field of Classification Search
CPC ............. G06F 16/1827; G06F 16/1734; G06F 7/5443; G06F 11/3034; G06N 3/08
See application file for complete search history.

(56) References Cited

U.S. PATENT DOCUMENTS

| 7,197,576 B1 | 3/2007 | Lo et al. |
| 2017/0160951 A1* | 6/2017 | Borlick ................. G06F 3/0631 |

(Continued)

FOREIGN PATENT DOCUMENTS

| CA | 2166420 C | 3/2006 |
| CN | 105283879 B | 3/2018 |

(Continued)

OTHER PUBLICATIONS

Duan et al. ("A Construction Method and Data Migration Strategy for Hybrid Cloud Storage"; 18th International Conference on Computing and Information Technology (ICCIT), Dec. 21-23, 2015) (Year: 2015).*

(Continued)

*Primary Examiner* — Ken Hoang
(74) *Attorney, Agent, or Firm* — Shephen J. Walder, Jr.; Steven Bouknight

(57) ABSTRACT

A mechanism is provided in a data processing system for hybrid cloud management. The mechanism generates hybrid cloud storage features and hybrid cloud environment factors. The mechanism performs a dynamic confidence method on the hybrid cloud features based on the hybrid cloud environment factors using a deep learning model to generate a hybrid cloud storage profile. The mechanism performing model optimization on the deep learning model and generating a files-storage matrix. The mechanism generates a hybrid cloud file profile based on the hybrid cloud storage profile and the files-storage matrix. The mechanism generates a target file matrix based on the hybrid cloud storage profile and the hybrid cloud file profile. The mechanism stores files based on the target file matrix.

18 Claims, 13 Drawing Sheets

(51) Int. Cl.
    *G06N 3/08*     (2023.01)
    *G06F 7/544*     (2006.01)
    *G06F 11/30*     (2006.01)

(56) References Cited

U.S. PATENT DOCUMENTS

2018/0115468 A1*   4/2018   Bildhauer .............. G06F 9/5055
2019/0190797 A1*   6/2019   Asthana ................ H04L 41/145

FOREIGN PATENT DOCUMENTS

WO     WO2019015598 A1     1/2019
WO     WO2019/126265 A1     6/2019

OTHER PUBLICATIONS

"What is Intelligent Storage", https://www.hpe.com/in/en/what-is/intelligent-storage.html, Accessed from the internet on Dec. 11, 2019, 5 pages.

Jeong, Hwa Y. et al., "An Efficient Cloud Storage Model for Cloud Computing Environment", GPC 2012: The 7th International Conference on Grid and Pervasive Computing, May 2012, 7 pages.

Zhu, Yan et al., "Efficient Provable Data Possession for Hybrid Clouds", CCS'10, 17th ACM Conference on Computer and Communications Security, Oct. 4-8, 2010, 3 pages.

\* cited by examiner

FIG. 3

| CATEGORY | GENRE | FEATURES |
|---|---|---|
| Public Cloud Storage | Memory<br>SSD<br>local disks<br>SDN (GlusterFS/Ceph)<br>Public Cloud<br>Storage (S3) | 1. Space<br>2. Timestamp of Space<br>3. Data center<br>4. Site/Country<br>5. Genre<br>6. R/W<br>7. Cost<br>8. Security<br>9. Special policy |
| Private Cloud Storage | Memory<br>SSD<br>local disks<br>SDN (GlusterFS/Ceph)<br>Public Cloud<br>Storage (S3) | 1. Space<br>2. Timestamp of Space<br>3. Site/Country<br>4. Genre<br>5. R/W<br>6. Cost<br>7. Security<br>8. Special policy |
| Premise Storage | Memory<br>SSD<br>local disks<br>SDN (GlusterFS/Ceph)<br>Public Cloud<br>Storage (S3) | 1. Space<br>2. Timestamp of Space<br>3. Site/Country<br>4. Genre<br>5. R/W<br>6. Cost<br>7. Security<br>8. Special policy |

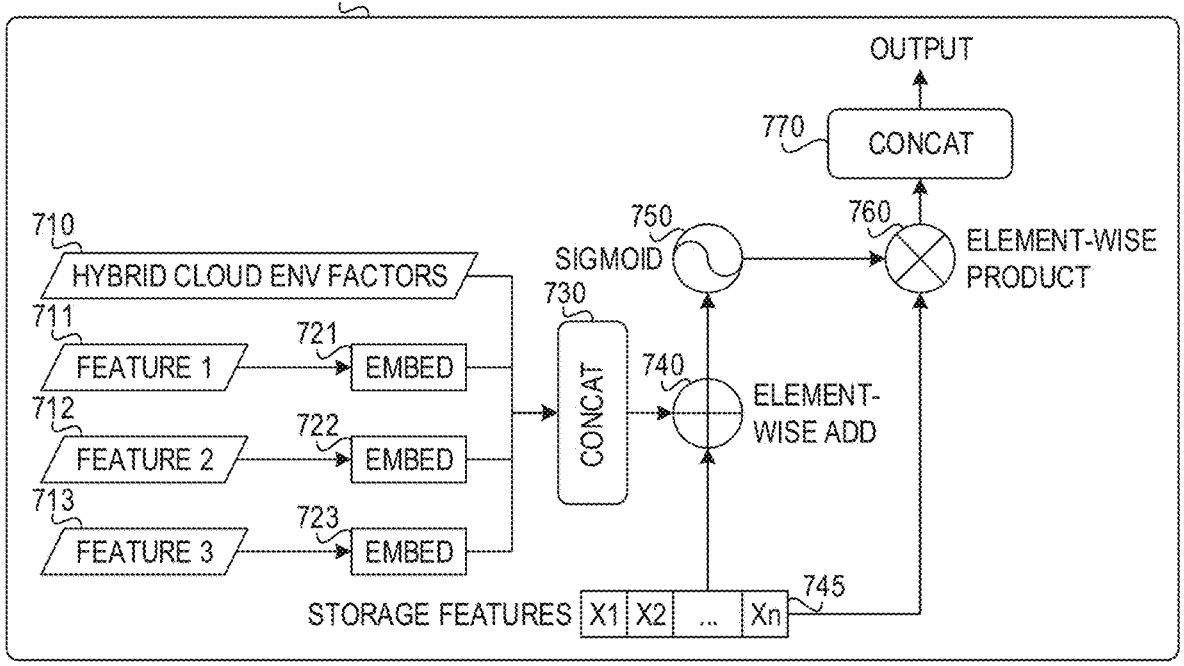

FIG. 7

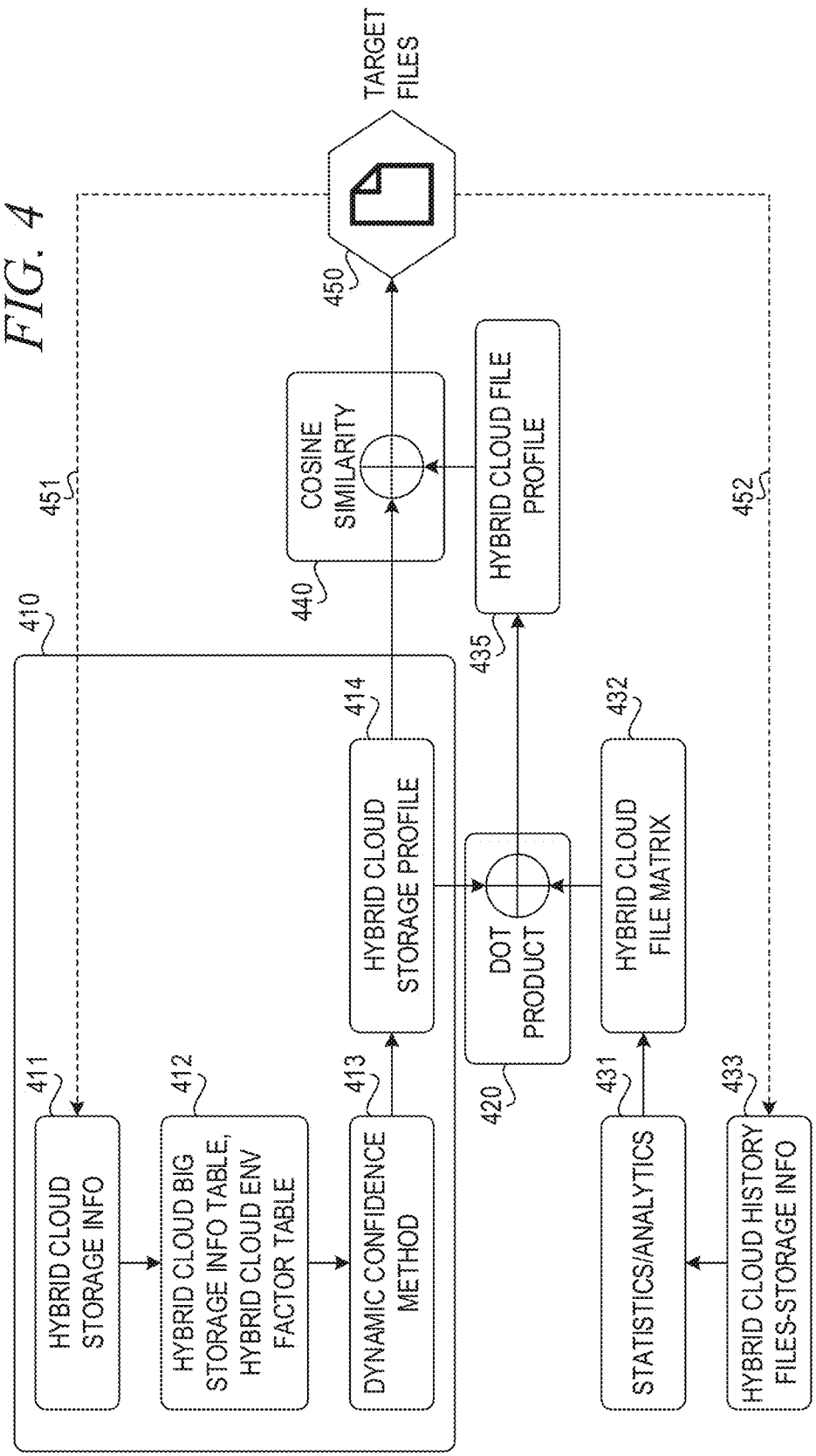

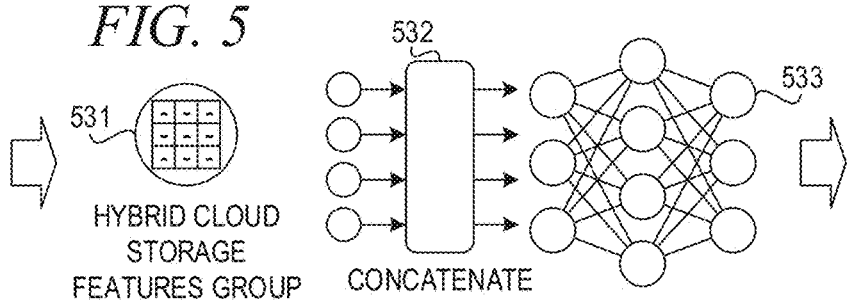
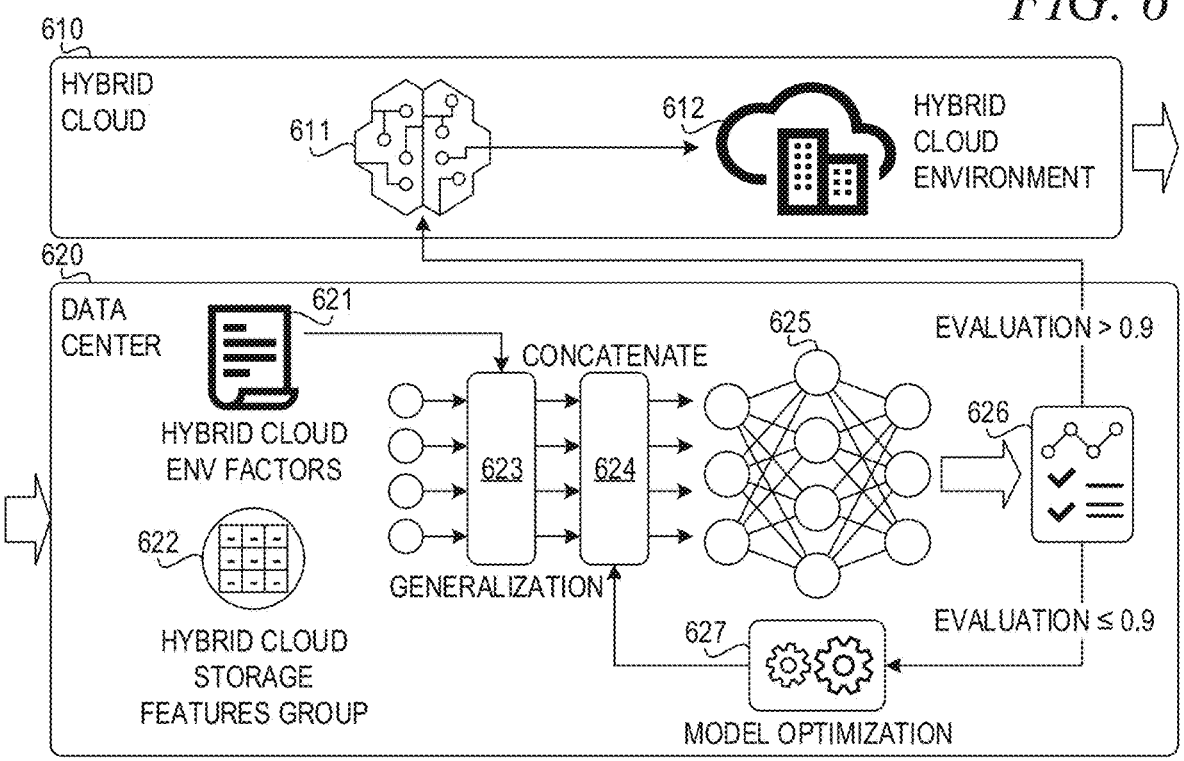

COGNITIVE METHOD TO PERCEIVE STORAGES FOR HYBRID CLOUD MANAGEMENT

BACKGROUND

The present application relates generally to an improved data processing apparatus and method and more specifically to mechanisms to incorporate hybrid cloud environment factors into multi-networks as dynamic model to perceive storage category/genre.

Cloud storage is a model of computer data storage in which the digital data is stored in logical pools. The physical storage spans multiple servers, sometimes in multiple locations, and the physical environment is typically owned and managed by a hosting company. These cloud storage providers are responsible for keeping the data available and accessible, and the physical environment protected and running Organizations buy or lease storage capacity from the providers to store user, organization, or application data.

Hybrid cloud is a composition of a public cloud and a private environment, such as a private cloud or on-premise resources, that remain distinct entities but are bound together, offering the benefits of multiple deployment models. Hybrid cloud can also mean the ability to connect collocation, managed and/or dedicated services with cloud resources. A hybrid cloud storage is a cloud computing service that is composed of some combination of private cloud, public cloud, and premise storage services, from different service providers. A hybrid cloud storage crosses isolation and provider boundaries so that it cannot be simply put in one category of private cloud, public cloud, or premise storage. It allows one to extend either the capacity or the capability of a cloud service, by aggregation, integration or customization with another cloud service.

Varied use cases for hybrid cloud composition exist. For example, an organization may store sensitive client data in house on a private cloud application but interconnect that application to a business intelligence application provided on a public cloud as a software service. This example of hybrid cloud extends the capabilities of the enterprise to deliver a specific business service through the addition of externally available public cloud services. Hybrid cloud adoption depends on several factors such as data security and compliance requirements, level of control needed over data, and the applications an organization uses.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for hybrid cloud management. The method comprises generating hybrid cloud storage features and hybrid cloud environment factors. The method further comprises performing a dynamic confidence method on the hybrid cloud features based on the hybrid cloud environment factors using a deep learning model to generate a hybrid cloud storage profile. The hybrid cloud storage profile provides, for each storage, a prediction for each combination of category and genre. The method further comprises performing model optimization on the deep learning model. The method further comprises generating a files-storage matrix. The method further comprises generating a hybrid cloud file profile based on the hybrid cloud storage profile and the files-storage matrix. The hybrid cloud profile provides, for each file, a prediction for each combination of category and genre. The method further comprises generating a target file matrix based on the hybrid cloud storage profile and the hybrid cloud file profile. The target file matrix provides, for each file, a prediction for each storage. The method further comprises storing files based on the target file matrix.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 illustrates the categories, genres, and features for hybrid cloud storage;

FIG. 4 is a block diagram illustrating hybrid cloud management in accordance with an illustrative embodiment;

FIG. 5 depicts an example dynamic confidence method in accordance with an illustrative embodiment;

FIG. 6 is a block diagram of a dynamic confidence method that incorporates hybrid cloud environment factors in accordance with an illustrative embodiment;

FIG. 7 is a block diagram of a generalization function in accordance with an illustrative embodiment;

DETAILED DESCRIPTION

Figure 1:
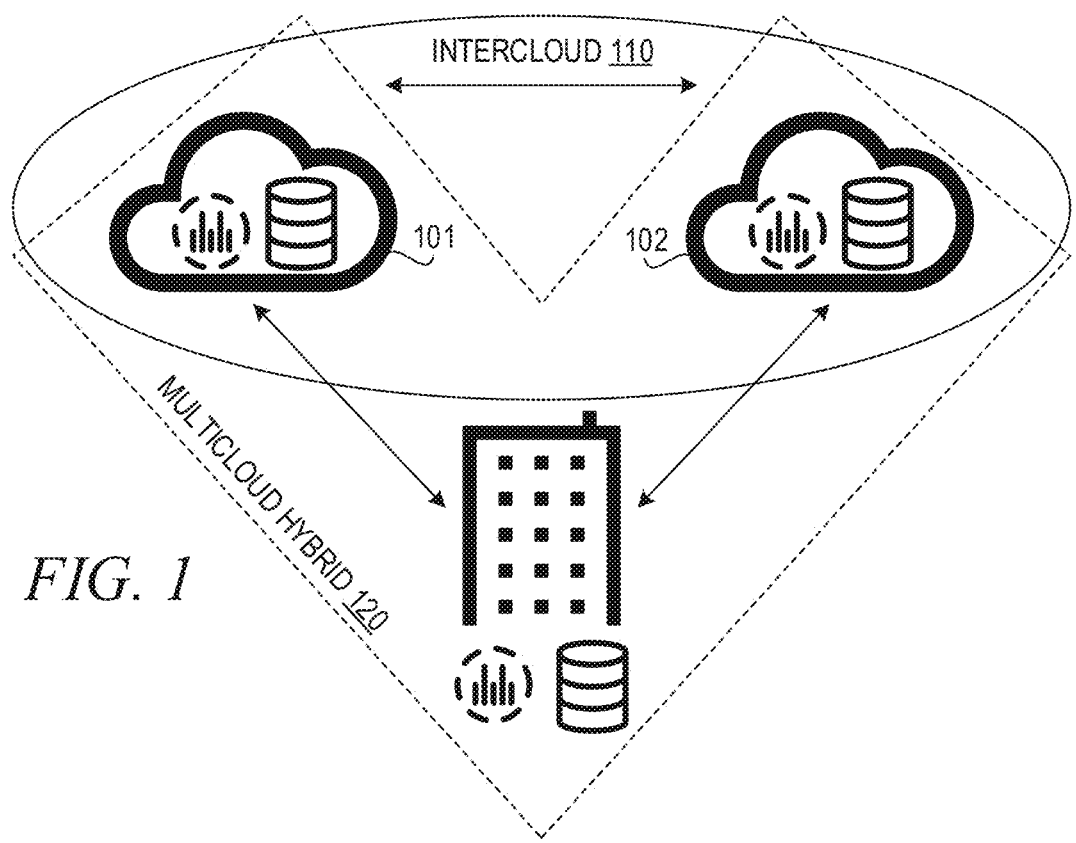
FIG. 1 illustrates an intercloud and multi-cloud hybrid cloud architecture in which aspects of the illustrative embodiments may be implemented.

The increased adoption of multi-cloud and intercloud deployments in support of storage and data management solutions has important implications for data and analytics strategies. Data and analytics leaders must prepare for these impacts to ensure optimal use of cloud resources.

A recent survey on cloud adoption revealed that 80% of respondents using public cloud are using more than one cloud service provider (CSP). These mutli-cloud architectures often arise organically through the consumption of specific services or Software-as-a-service (SaaS) offerings that may not align with the primary cloud strategy, and therefore add complexity to cloud operations.

CSP offerings are becoming the new platform and have all of the integration challenges that on-premises platforms had before them. When used in multi-cloud and intercloud scenarios, there is the added complexity of network latency, as well as data transfer concerns. Business requirements, local policies, and storage attributes are also constantly changing. Using traditional storage management methods, it is hard to manage hybrid clouds. The security problem is very important. The leakage of private data and the illegal storage of personal data will be a big challenge to the enterprise.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" regarding features and elements of the illustrative embodiments. It should be appreciated that these terms and phrases are intended to state that there is at least one of the feature or element present in the illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with an engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

FIG. 1 illustrates an intercloud and multi-cloud hybrid cloud architecture in which aspects of the illustrative embodiments may be implemented. Intercloud 110 comprises data stored in a first cloud storage 101 and a second cloud storage 102. These cloud storages 101, 102 are combined into multi-cloud hybrid 120. FIG. 1 demonstrates different storages deployed in a complex hybrid/multi cloud environment.

Figure 2:
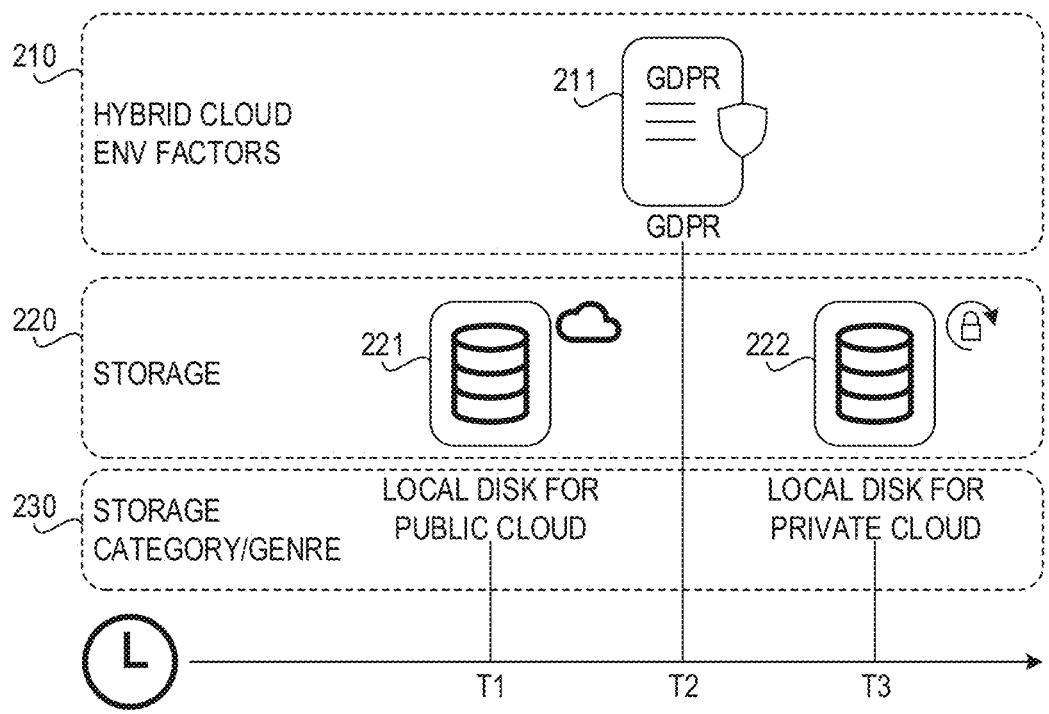
FIG. 2 depicts allocation of files to multiple cloud storage services in accordance with an illustrative embodiment.

FIG. 2 depicts allocation of files to multiple cloud storage services in accordance with an illustrative embodiment. In the depicted example, a data center in Europe stores files in storage 220 based on storage category/genre 230. FIG. 3 illustrates the categories, genres, and features for hybrid cloud storage. The category/genre of storage changes with time, spatial, security, policies, etc. This adds additional complexity to cloud operations. The illustrative embodiment addresses how to detect the changes of storage category/genre in hybrid cloud environment using artificial intelligence.

At time T1, the data center stores files on public cloud storage 221 with a category of public cloud and a genre of local disk. As seen in FIG. 3, for public cloud storage, the features are space, timestamp of space, data center, site/country, genre, read/write (R/W), cost, security, and special policy.

At time T2, the data center implements a new policy, the General Data Protection Regulation (GDPR) 211. The General Data Protection Regulation (EU) 2016/679 (GDPR) is a regulation on data protection and privacy in the European Union (EU) and the European Economic Area (EEA). GDPR also addresses the transfer of personal data outside the EU and EEA areas. The GDPR aims primarily to give control to individuals over their personal data and to simplify the regulatory environment for international business by unifying the regulation within the EU. In response, at time T3, the data center moves the files to private cloud storage 222 with a category of private cloud and a genre of local disk. As seen in FIG. 3, for private cloud storage, the features are space, timestamp of space, site/country, genre, R/W, cost security, and special policy.

Moving files from public storage to private storage involves complex IT maintenance, and the data management has a resource cost. Chaotic storage increases risk. The illustrative embodiments incorporate hybrid cloud environment factors into multi-networks as dynamic model to perceive storage category/genre. The illustrative embodiments incorporate environment factors to transfer the policy's change into weight adjustment. The illustrative embodiments provide a multi-model combination to improve the confidence of the dynamic model by adjusting the weight of each training instance.

FIG. 4 is a block diagram illustrating a hybrid cloud management engine in accordance with an illustrative embodiment. In block 410, the hybrid cloud management engine obtains hybrid cloud storage information 411 and generates hybrid cloud big storage information table and a hybrid cloud environment factor table 412. The hybrid cloud management engine then performs a dynamic confidence method 413. The dynamic confidence method 413 is described in further detail below with reference FIGS. 6-8. The hybrid cloud management engine generates hybrid cloud storage profile (snapshot) 414.

The hybrid cloud management engine includes feedback paths 451, 452. Feedback path 451 provides hybrid cloud storage information 411 from the previous target file allocation 450. Feedback path 452 provides hybrid cloud history files-storage information 433. The hybrid cloud management engine performs statistics/analytics 431 and generates hybrid cloud file matrix 432.

The hybrid cloud management engine performs a dot product 420 on hybrid cloud storage profile 414 and hybrid cloud file matrix 432. An example of dot product 420 is described below with reference to FIG. 9B. Dot product 420 generates hybrid cloud file profile (snapshot) 435.

The hybrid cloud management engine performs cosine similarity function 440 on hybrid cloud storage profile 414 and hybrid cloud file profile 435. An example of cosine similarity function 440 is described below with reference to FIG. 9C. Cosine similarity function 440 generates target file matrix 450.

FIG. 5 depicts an example dynamic confidence method in accordance with an illustrative embodiment. The dynamic confidence method receives hybrid cloud storage features group 531. The dynamic confidence method performs concatenate function 532 to concatenate the hybrid cloud storage features 531. The dynamic confidence method provides the concatenated features to deep learning model 533. Model 533 may be a neural network, linear regression model, or any other deep learning model to classify the features into a category/genre classification.

When the hybrid cloud environment factors change, the model cannot handle the environment factor changes and the generalization ability is weak. Retraining the model costs time and resources. Furthermore, the model is not aware of the environment changes, and model accuracy will decrease.

FIG. 6 is a block diagram of a dynamic confidence method that incorporates hybrid cloud environment factors in accordance with an illustrative embodiment. The dynamic confidence method includes hybrid cloud 610 and data center 620. At the data center, the inputs include hybrid cloud environment factors 621 and hybrid cloud storage features group 622. Generalization function 623 incorporates the hybrid cloud environment factors 621 and hybrid cloud storage features 622. Generalization function 623 is described in further detail below with reference to FIG. 7. Generalization function 623 is a key component that effects the dynamic confidence method of the illustrative embodiment.

Concatenate function 624 concatenates the hybrid cloud environment factors 621 and hybrid cloud storage features 622. The concatenated features are provided to model 625, which classifies the concatenated features into a category/genre 626.

The dynamic confidence method performs an evaluation of the category/genre classification and determines whether the prediction is accurate. The evaluation uses a technique, such as Distilling, and tests the model and method in one data center. After obtaining the hybrid cloud environment factors, the evaluation puts them into the generalization function 623 with the original model (without retraining) to get a prediction, and evaluates the prediction with the real label, which is obtained from this data center. In the depicted example, the evaluation results in a confidence between 0 and 1. If the evaluation is less than or equal to 0.9, then the dynamic confidence method performs model optimization 627. The threshold of 0.9 is an example, which may vary depending on the implementation. The operation of model optimization module 627 is described in further detail below.

If the evaluation is greater than the threshold, 0.9 in the depicted example, then the category/genre classification 626 is provided to hybrid cloud 610. Model deployment function 611 includes artificial intelligence (AI) analysis and model deployment. Model deployment function 611 performs AI analysis, deploys the model, and publishes the model to the hybrid cloud. Model deployment function 611 stores files to hybrid cloud environment 612 according to the category/genre classification 626.

FIG. 7 is a block diagram of a generalization function in accordance with an illustrative embodiment. Generalization function 700 performs concatenation function 700 on hybrid cloud environment factors 710 and features 711-713. Embedding is a method used to represent storage features as continuous vectors. Embed 721-723 represents the resulting continuous vectors. Generalization function 700 then performs element-wise add 740 on the concatenated features and storage features 745. Storage features 745 may be the features shown in FIG. 3. Then, generalization function 700 performs sigmoid function 750 on the result of the element-wise add 740 and element-wise product 760 on the result of sigmoid function 750 and storage features 745. Thereafter, the generalization function 700 performs concatenation 770 to generate the output. Concatenation 770 may be the same concatenation 624 from FIG. 6.

A single model works well; however, the model can be improved. The model optimization module 627 in FIG. 6 improves the model. The model optimization module 627 uses a combination of predictors to achieve a better model. Assume that for each kind of training instance, the initial weight of each predictor is as follows:

$$w^i = \frac{1}{m},$$

where m is the number of instances. Then, for the $j^{th}$ model, the weighted error can be calculated as follows:

$$r_j = \frac{\sum_{i=1}^{m} w^i_{(\hat{y}^i \neq y^i)}}{\sum_{k=1}^{m} w^i},$$

where $\hat{y}^i$ is the predicted result, while $y^i$ is the actual value. The weight of each model can be calculated as follows:

$$\alpha^j = \beta * \log\frac{1 - r_j}{r_j},$$

where β is the learning rate of the model. The next step is to update the weight $w^i$ based on the prediction result of the previous model. The weight is updated as follows:

$$\text{for } i = 1, 2, \ldots, m, w^i = \begin{cases} w^i & \text{if } \hat{y}^j = y^j \\ w^i \exp(\alpha_j) & \text{if } \hat{y}^j \neq y^j \end{cases}$$

The model following the previous model updates the weight of instances based on the prediction result of the previous model. The model optimization module 627 generates the final prediction result based on the joint prediction result of all models as follows:

$$\hat{y}^i(x) = \max\left(\sum_{j=1}^{N} \alpha_j\right) \text{ for } \hat{y}_j(x) = k,$$

where N is the total number of models and k is the predicted value.

Figure 8:
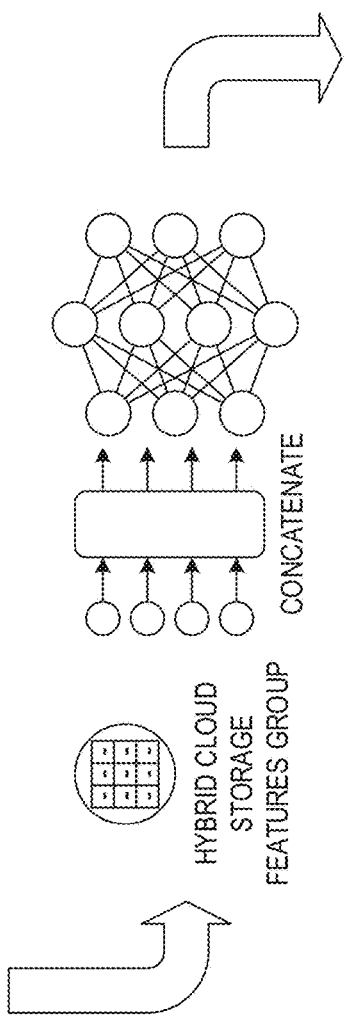
FIG. 8 illustrates a business case of generating a hybrid cloud storage profile without incorporating hybrid cloud environment factors in accordance with an illustrative embodiment.

FIG. 8 illustrates a business case of generating a hybrid cloud storage profile without incorporating hybrid cloud environment factors in accordance with an illustrative embodiment. The hybrid cloud storage features group 810 includes labels 811 and features 812. The labels 811 include the current category and genre. Features 812 are concatenated and provided to the deep learning model, which generates storage profile (Ns*Np) 820. The storage profile 820 provides, for each storage, a prediction for each combination of category and genre. For example, for storage_1, the highest prediction value is 0.85 for solid-state device (SSD) (genre) for public cloud (category).

Figure 9A:
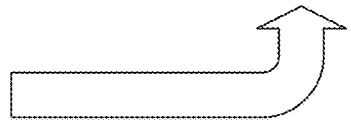
FIG. 9A illustrates a business case of generating a hybrid cloud storage profile incorporating hybrid cloud environment factors in accordance with an illustrative embodiment.

FIG. 9A illustrates a business case of generating a hybrid cloud storage profile incorporating hybrid cloud environment factors in accordance with an illustrative embodiment. The hybrid cloud storage features group 910 includes labels 911 and features 912. The labels 911 include the current category and genre. Table 920 represents the storage feature impact from a hybrid cloud environment factor change, the value is the weight of the impact to the features. For example, GDPR has impact to storage feature "Data center," "Country," and "Security" as weight 1. The features 912 and the hybrid cloud environment factors are combined using the generalization function and concatenated. The resulting concatenated features are provided to a deep learning model, which generates storage profile (Ns*Np) 930. The storage profile 930 provides, for each storage, a prediction for each combination of category and genre, For example, for storage_1, the highest prediction value is 0.78 for SSD (genre) for private cloud (category).

Figure 9B:
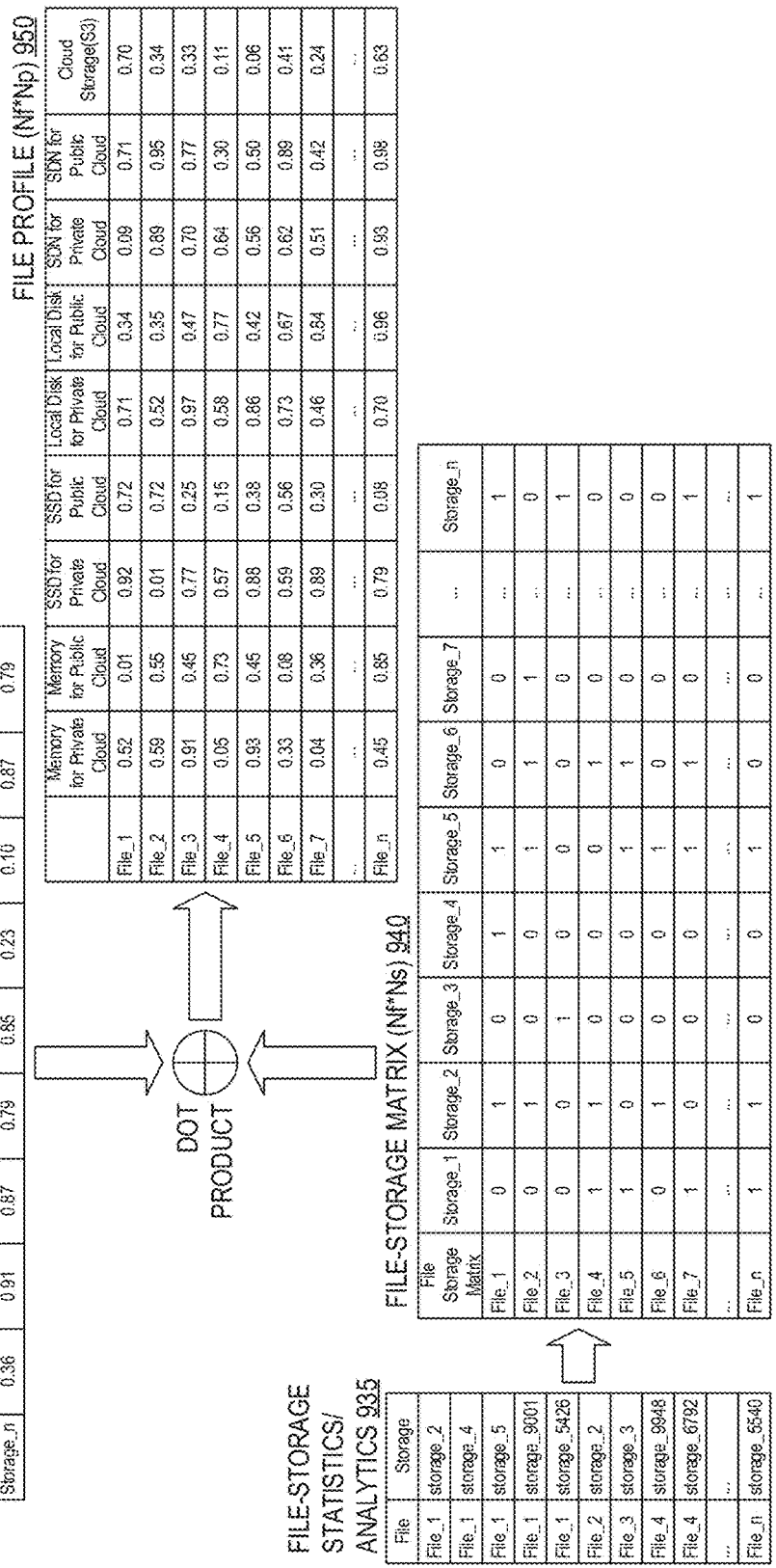
FIG. 9B illustrates a business case of generating a file profile in accordance with an illustrative embodiment.

FIG. 9B illustrates a business case of generating a file profile in accordance with an illustrative embodiment. File-storage statistics/analytics 935 indicates which storages each file is stored on. For example, file_1 is stored on storage_2, storage_4, storage_5, storage_9001, and storage_5426. File-storage matrix (Nf*Ns) 940 is generated form File-storage statistics/analytics 935. File-storage matrix 940 indicates the same information form file-storage statistics/analytics 935 in matrix form.

A dot product is performed on storage profile 930 and file-storage matrix 940 to generate file profile (Nf*Np) 950. The file profile 950 provides, for each file, a prediction for each combination of category and genre. For example, for file_1, the highest prediction value is 0.92 for SSD for private cloud.

Figure 9C:
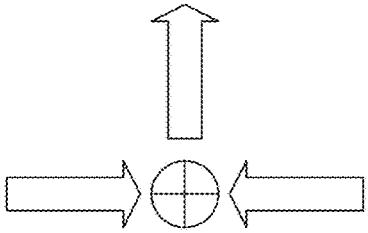
FIG. 9C illustrates a business case of generating a target file matrix in accordance with an illustrative embodiment.

FIG. 9C illustrates a business case of generating a target file matrix in accordance with an illustrative embodiment. A cosine similarity is performed on storage profile 930 and file profile 950 to generate target file matrix 960. The target file matrix 960 provides, for each file, a prediction for each storage. For example, for file_1, the highest prediction value is 0.89 for storage_1.

Figure 10:
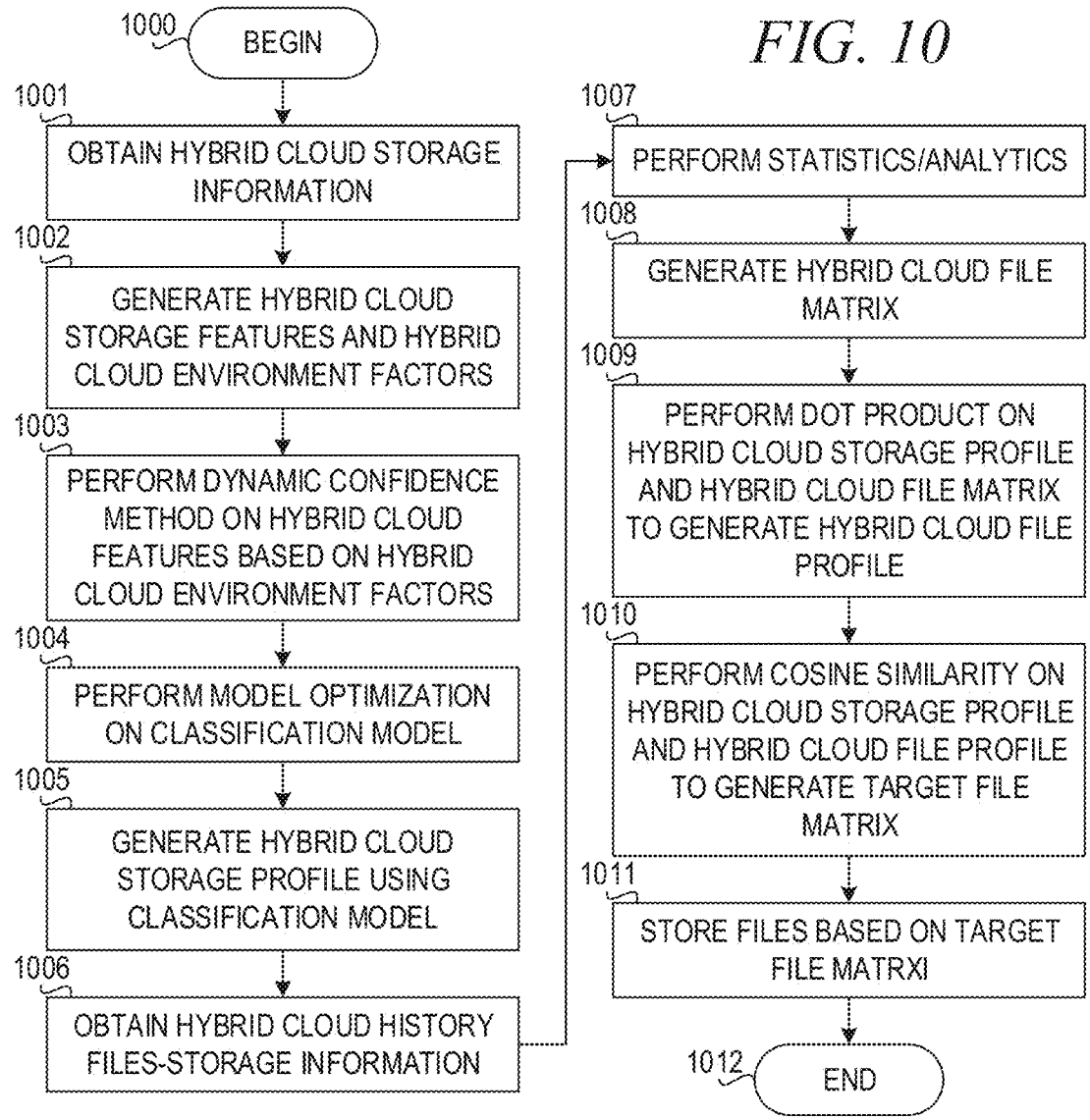
FIG. 10 is a flowchart illustrating operation of a hybrid cloud management system in accordance with an illustrative embodiment.

FIG. 10 is a flowchart illustrating operation of a hybrid cloud management system in accordance with an illustrative embodiment. Operation begins (block 1000), and the hybrid cloud management system obtains hybrid cloud storage information (block 1001). The hybrid cloud management system generates hybrid cloud storage features and hybrid cloud environment factors (block 1002). Then, the hybrid cloud management system performs a dynamic confidence method on hybrid cloud features based on the hybrid cloud environment factors (block 1003). The hybrid cloud management system performs model optimization on the classification model (block 1004). Then, the hybrid cloud management system generates a hybrid cloud storage profile using the optimized classification model (block 1005).

The hybrid cloud management system obtains hybrid cloud history files-storage information (block 1006). The hybrid cloud management system performs statistics/analytics (block 1007) and generates a hybrid cloud file matrix (block 1008). Then, the hybrid cloud management system performs a dot product on the hybrid cloud storage profile and the hybrid cloud file matrix to generate a hybrid cloud file profile (block 1009).

The hybrid could management system then performs a cosine similarity on the hybrid cloud storage profile and the hybrid cloud file profile to generate a target file matrix (block 1010). The hybrid cloud management system stores the files according to the target file matrix (block 1011). Thereafter, operation ends (block 1012).

Figure 11:
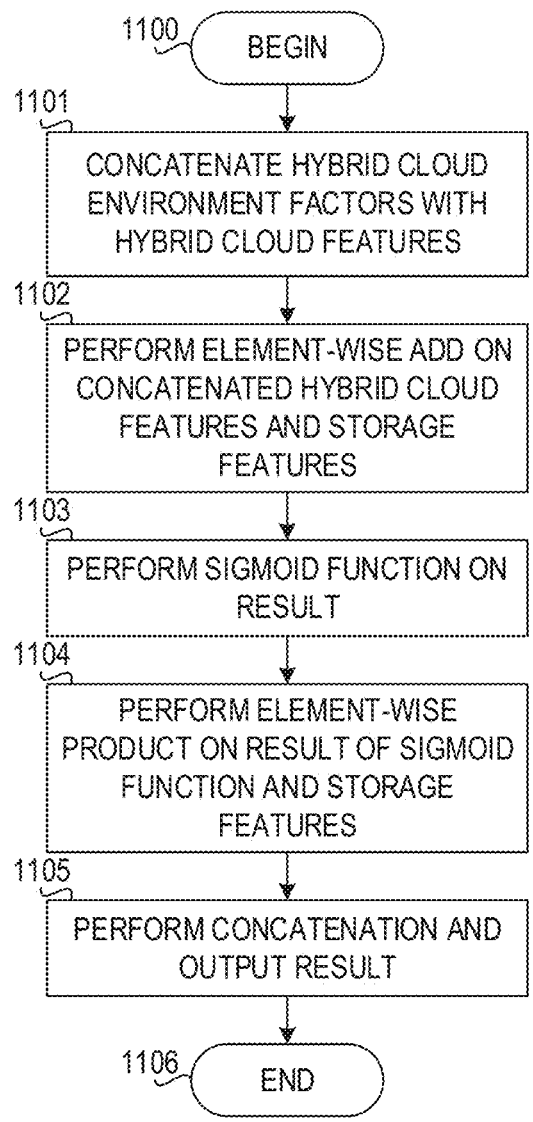
FIG. 11 is a flowchart illustrating operation of a generalization function in accordance with an illustrative embodiment.

FIG. 11 is a flowchart illustrating operation of a generalization function in accordance with an illustrative embodiment. Operation begins (block 1100), and the generalization function concatenates the hybrid cloud environment factors with the hybrid cloud features (block 1101). The generalization function performs an element-wise add on the concatenated hybrid cloud features and the storage features (block 1102). Then, the generalization function performs a sigmoid function on the result of the element-wise add (block 1103) and performs an element-wise product on the result of the sigmoid function and storage features (block 1104). The generalization function performs a concatenation and outputs the result (block 1105). Thereafter, operation ends (block 1106).

Figure 12:
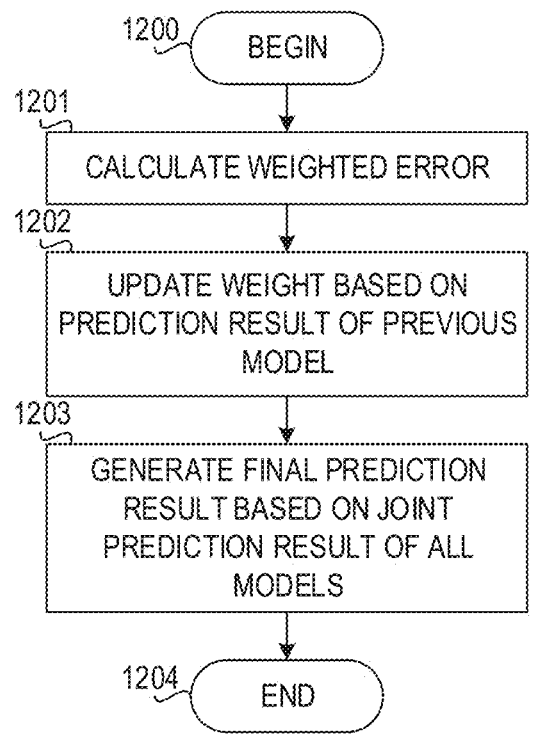
FIG. 12 is a flowchart illustrating operation of the model optimization module in accordance with an illustrative embodiment.

FIG. 12 is a flowchart illustrating operation of the model optimization module in accordance with an illustrative embodiment. Operation begins (block 1200), and the model optimization module calculates a weighted error (block 1201). Then, the model optimization module updates weights based on the prediction result of the previous model (block 1202). The model optimization module generates the final prediction result based on joint prediction result of all models (block 1203). Thereafter, operation ends (block 1204).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
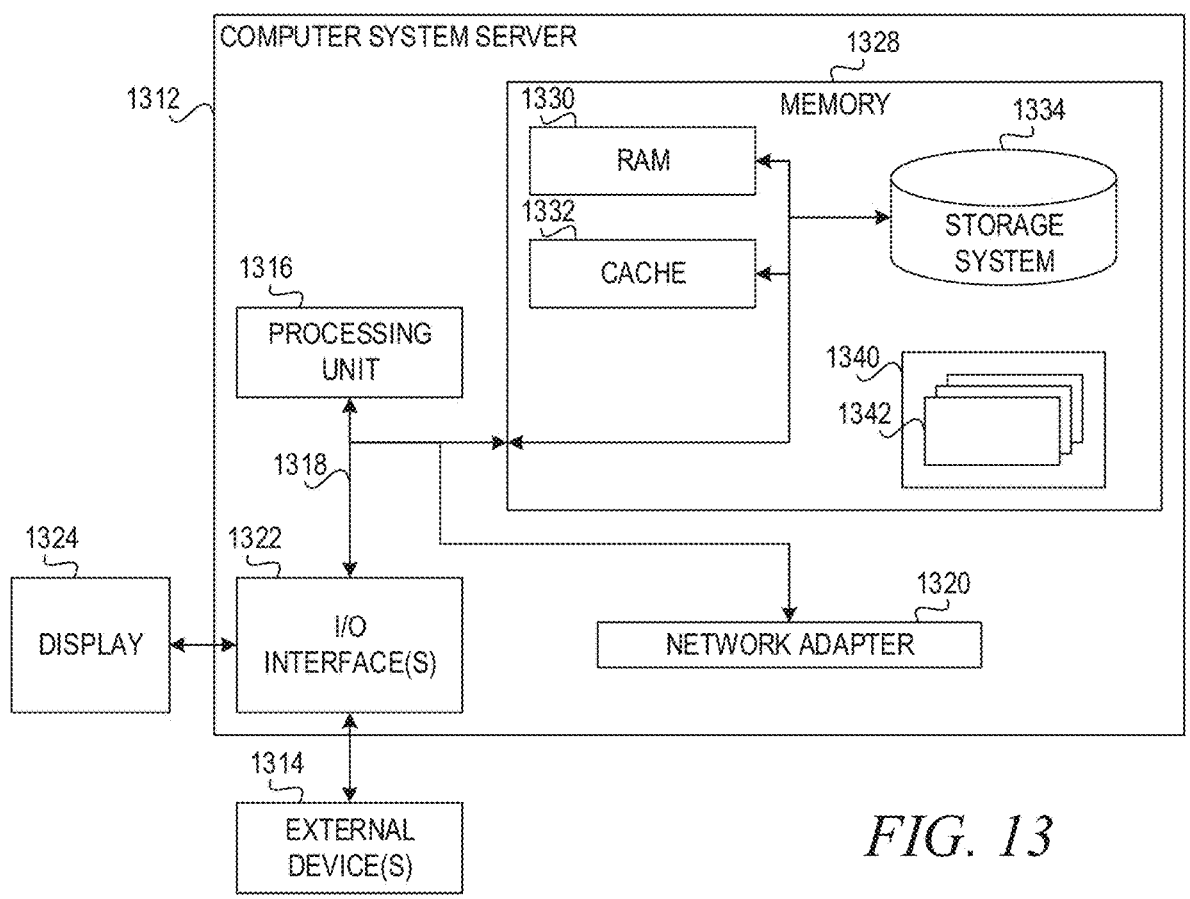
FIG. 13 depicts a cloud computing node according to an illustrative embodiment.

Referring now to FIG. 13, a schematic of an example of a cloud computing node is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 14:
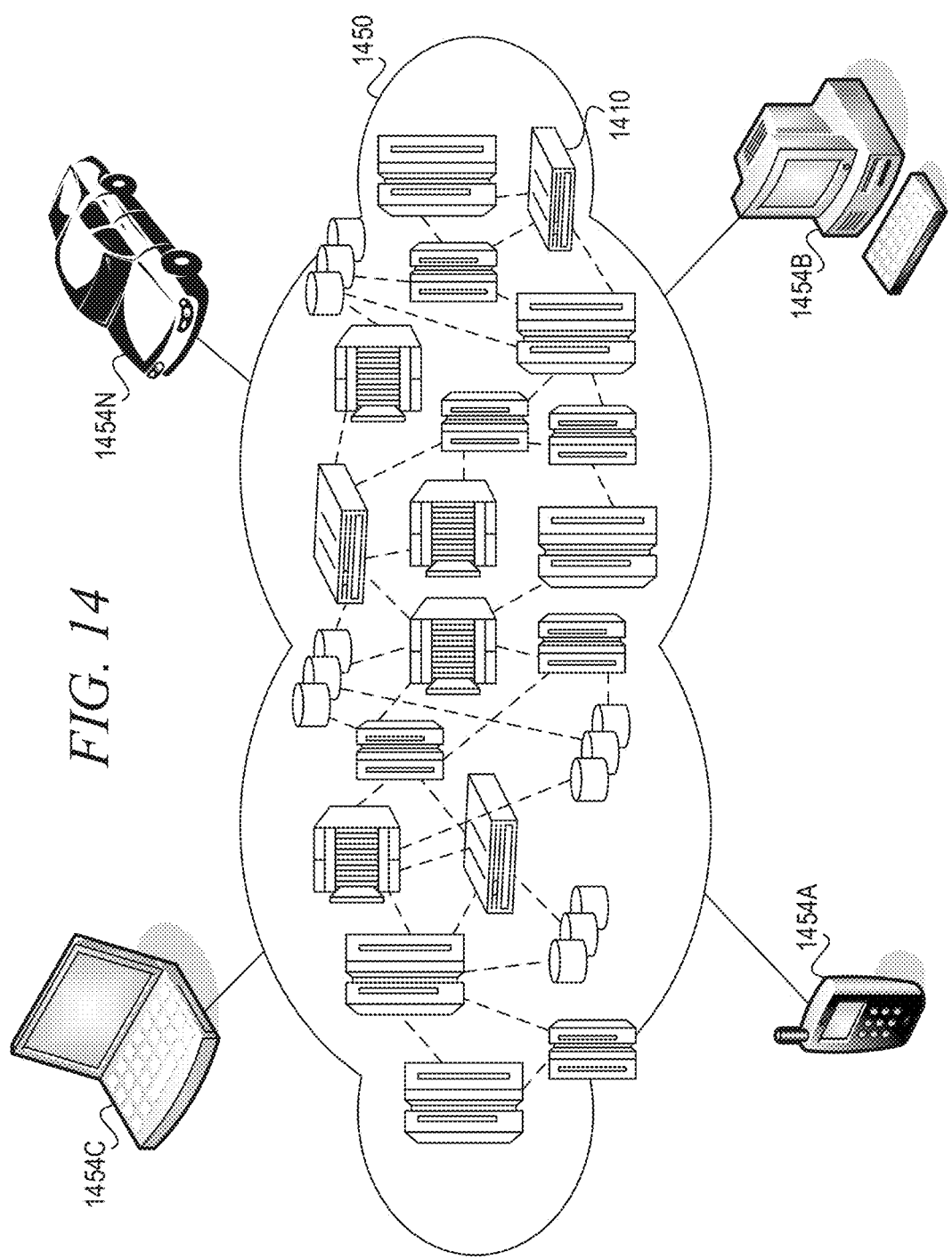
FIG. 14 depicts a cloud computing environment according an illustrative embodiment.

Referring now to FIG. 14, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
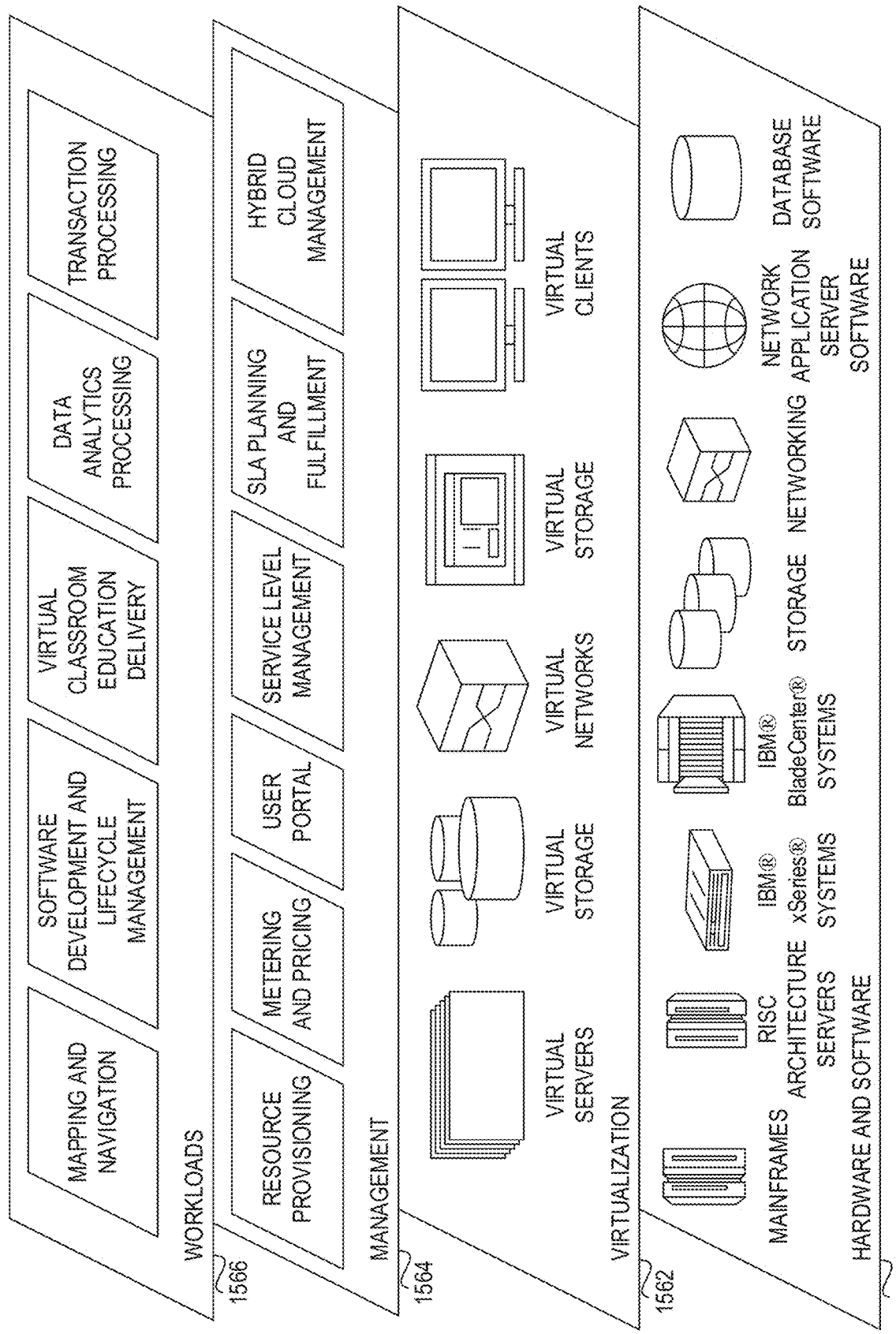
FIG. 15 depicts abstraction model layers according to an illustrative embodiment.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Hybrid cloud management incorporates hybrid cloud environment factors into multi-networks as a dynamic confidence model to perceive storage category/genre.

Workloads layer 1566 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for hybrid cloud management, the method comprising:
   generating hybrid cloud storage features and hybrid cloud environment factors;
   performing a dynamic confidence method on the hybrid cloud features based on the hybrid cloud environment factors using a deep learning model to generate a hybrid cloud storage profile, wherein the hybrid cloud storage profile provides, for each storage, a prediction for each combination of category and genre;
   performing model optimization on the deep learning model;
   generating a files-storage matrix;
   generating a hybrid cloud file profile based on the hybrid cloud storage profile and the files-storage matrix, wherein the hybrid cloud file profile provides, for each file, a prediction for each combination of category and genre, and wherein generating the hybrid cloud file profile comprises performing a dot product on the hybrid cloud storage profile and the files-storage matrix;
   generating a target file matrix based on the hybrid cloud storage profile and the hybrid cloud file profile, wherein the target file matrix provides, for each file, a prediction for each storage; and
   storing files based on the target file matrix.

2. The method of claim 1, wherein the deep learning model classifies the hybrid cloud features and hybrid cloud environment factors into a category and genre.

3. The method of claim 2, wherein the category is public cloud storage, private cloud storage, or premise storage.

4. The method of claim 2, wherein the genre is memory, solid-state device (SSD) storage, local disks, software-defined network (SDN) storage, or public cloud storage.

5. The method of claim 1, wherein the hybrid cloud storage features comprise space, timestamp of space, data center, site, genre, read/write, cost, security, special policy.

6. The method of claim 1, wherein performing the dynamic confidence method comprises:
  concatenating the hybrid cloud environment factors and the hybrid cloud features to generate concatenated features;
  performing an element-wise add on the concatenated features and storage features;
  performing a sigmoid function on a result of the element-wise add; and
  performing an element-wise product on a result of the sigmoid function and the storage features.

7. The method of claim 1, wherein performing model optimization comprises:
  calculating an initial weight of each predictor is as follows:

$$w^i = \frac{1}{m},$$

where m is the number of instances;
  calculating a weighted error as follows:

$$r_j = \frac{\sum_{\substack{i=1 \\ (\hat{y}^i \neq y^i)}}^{m} w^i}{\sum_{i=1}^{m} w^i},$$

where $\hat{y}^i$ is a predicted result and $y^i$ is an actual value;
  calculating a weight of each model as follows:

$$\alpha^j = \beta * \log\frac{1-r_j}{r_j},$$

where β is a learning rate of the model;
  updating the weight as follows:

$$\text{for } i = 1, 2, \ldots, m, w^i = \begin{cases} w^i & \text{if } \hat{y}^i = y^i \\ w^i \exp(\alpha_j) & \text{if } \hat{y}^i \neq y^i \end{cases}$$

generating a final prediction result based on a joint prediction result of all models as follows:

$$\hat{y}^i(x) = \max\left(\sum_{j=1}^{N} \alpha_j\right) \text{ for } \hat{y}_j(x) = k,$$

where N is a total number of models and k is the predicted value.

8. The method of claim 1, wherein generating the target file matrix comprises performing a cosine similarity on the hybrid cloud storage profile and the hybrid cloud file profile.

9. The method of claim 1, wherein generating the files-storage matrix comprises:
  performing analytics to obtain file-storage statistics; and
  generating the files-storage matrix based on the file-storage statistics.

10. A computer program product comprising a computer readable storage medium having a computer readable program stored therein, wherein the computer readable program, when executed on a computing device, causes the computing device to:
  generate hybrid cloud storage features and hybrid cloud environment factors;
  perform a dynamic confidence method on the hybrid cloud features based on the hybrid cloud environment factors using a deep learning model to generate a hybrid cloud storage profile, wherein the hybrid cloud storage profile provides, for each storage, a prediction for each combination of category and genre;
  perform model optimization on the deep learning model;
  generate a files-storage matrix;
  generate a hybrid cloud file profile based on the hybrid cloud storage profile and the files-storage matrix, wherein the hybrid cloud file profile provides, for each file, a prediction for each combination of category and genre, and wherein generating the hybrid cloud file profile comprises performing a dot product on the hybrid cloud storage profile and the files-storage matrix;
  generate a target file matrix based on the hybrid cloud storage profile and the hybrid cloud file profile, wherein the target file matrix provides, for each file, a prediction for each storage; and
  store files based on the target file matrix.

11. The computer program product of claim 10, wherein the deep learning model classifies the hybrid cloud features and hybrid cloud environment factors into a category and genre.

12. The computer program product of claim 11, wherein the category is public cloud storage, private cloud storage, or premise storage.

13. The computer program product of claim 11, wherein the genre is memory, solid-state device (SSD) storage, local disks, software-defined network (SDN) storage, or public cloud storage.

14. The computer program product of claim 10, wherein the hybrid cloud storage features comprise space, timestamp of space, data center, site, genre, read/write, cost, security, special policy.

15. The computer program product of claim 10, wherein performing the dynamic confidence method comprises:
  concatenating the hybrid cloud environment factors and the hybrid cloud features to generate concatenated features;
  performing an element-wise add on the concatenated features and storage features;
  performing a sigmoid function on a result of the element-wise add; and
  performing an element-wise product on a result of the sigmoid function and the storage features.

16. The computer program product of claim 10, wherein performing model optimization comprises:
  calculating an initial weight of each predictor is as follows:

$$w^i = \frac{1}{m},$$

where m is the number of instances;
  calculating a weighted error as follows:

$$r_j = \frac{\sum_{\substack{i=1 \\ (\hat{y}^i \neq y^i)}}^{m} w^i}{\sum_{i=1}^{m} w^i},$$

where $\hat{y}^i$ is a predicted result and $y^i$ is an actual value;
calculating a weight of each model as follows:

$$\alpha^j = \beta * \log\frac{1-r_j}{r_j},$$

where $\beta$ is a learning rate of the model;
updating the weight as follows:

$$\text{for } i = 1, 2, \ldots, m, w^i = \begin{cases} w^i & \text{if } \hat{y}^j = y^i \\ w^i\exp(\alpha_j) & \text{if } \hat{y}^j \neq y^i \end{cases}$$

generating a final prediction result based on a joint prediction result of all models as follows:

$$\hat{y}^i(x) = \max\left(\sum_{j=1}^{N} \alpha_j\right) \text{ for } \hat{y}_j(x) = k,$$

where N is a total number of models and k is the predicted value.

17. The computer program product of claim 10, wherein generating the target file matrix comprises performing a cosine similarity on the hybrid cloud storage profile and the hybrid cloud file profile.

18. An apparatus comprising:
a processor; and
a memory coupled to the processor, wherein the memory comprises instructions which, when executed by the processor, cause the processor to:
generate hybrid cloud storage features and hybrid cloud environment factors;
perform a dynamic confidence method on the hybrid cloud features based on the hybrid cloud environment factors using a deep learning model to generate a hybrid cloud storage profile, wherein the hybrid cloud storage profile provides, for each storage, a prediction for each combination of category and genre;
perform model optimization on the deep learning model;
generate a files-storage matrix;
generate a hybrid cloud file profile based on the hybrid cloud storage profile and the files-storage matrix, wherein the hybrid cloud file profile provides, for each file, a prediction for each combination of category and genre, and wherein generating the hybrid cloud file profile comprises performing a dot product on the hybrid cloud storage profile and the files-storage matrix;
generate a target file matrix based on the hybrid cloud storage profile and the hybrid cloud file profile, wherein the target file matrix provides, for each file, a prediction for each storage; and
store files based on the target file matrix.

* * * * *